United States Patent [19]

Crane et al.

[11] 3,890,141

[45] June 17, 1975

[54] CONVERSION OF SCRAP RUBBER TO FUEL AND USEFUL BY-PRODUCTS

[75] Inventors: Grant Crane; Edward L. Kay; Joseph R. Laman, all of Akron, Ohio

[73] Assignee: The Firestone Tire & Rubber Company, Akron, Ohio

[22] Filed: Nov. 15, 1973

[21] Appl. No.: 416,132

[52] U.S. Cl. .......................... 75/86; 75/24; 75/25; 75/44 S; 431/11; 260/94.7 D; 260/96 D; 260/85.1; 260/719
[51] Int. Cl... C08c 17/38; C08d 17/00; C08c 17/00
[58] Field of Search............ 260/94.7 D, 96 D, 719; 431/1, 11; 75/24, 25, 86, 44 S

[56] References Cited
UNITED STATES PATENTS

| | | | |
|---|---|---|---|
| 3,716,339 | 2/1973 | Masanobu et al. | 260/96 D X |
| 3,770,419 | 11/1973 | Brown | 75/44 S |
| 3,787,166 | 1/1974 | Schaub et al. | 260/96 D X |

*Primary Examiner*—William F. Hamrock

[57] ABSTRACT

Solid waste vulcanized rubber, such as scrap tires, is heat-treated to produce a fluid material which, in turn, is burned to produce heat energy and ash. Zinc and titanium are recovered from the ash.

10 Claims, No Drawings

CONVERSION OF SCRAP RUBBER TO FUEL AND USEFUL BY-PRODUCTS

BACKGROUND OF THE INVENTION

This invention relates to a process of converting solid waste vulcanized rubber into heat energy and recovering valuable metal oxides such as zinc oxide and titanium oxide.

Disposal of solid waste vulcanized rubber has become an important problem. The large volume of waste rubber, principally in the form of used tires, presents a mounting challenge to facilitate for waste treatment. Rising costs of reclaiming the rubber from used tires have all but eliminated the conventional reclaim plants, since the known processes for reclaiming rubber produce a product whose cost is too high for economical recycling into new rubber products.

Because of their intrinsically high content of hydrocarbons, scrap tires present a logical source of fuel. Incinerators designed to consume whole tires or chopped tire sections have been proposed, so as to convert scrap tires into heat energy. The handling of whole tires, or even chopped sections, however is difficult, and expensive, complicated machinery is needed to feed the materials and to remove non-combustible residues, such as metal and glass components, from the combustion area. In addition, these tire incinerators are constructed relatively large so that economic operation is possible. This can be an advantage in large industrial areas where the total heat released can be used in advantage. However, for less industrialized areas or less populated areas, it would be advantageous to convert scrap tires into a form that could be utilized in conventional boiler systems.

SUMMARY OF THE INVENTION

It has now been found that solid waste vulcanized rubber can be converted into heat energy by first processing the rubber to convert it to a fluid state. The fluid-state material can then be transferred into ordinary oil-fired boilers wherein it is burned to produce steam. The zinc and titanium compounds originally present in the rubber if not already in oxide form are converted to their respective oxides and can be relatively easily recovered by conventional ash collecting devices such as bag filters, cyclones, water-scrubbers or electrostatic precipitators.

The initial step of converting the solid waste rubber into a fluid consists of heating a mixture of the solid rubber and from about 10 to about 1,000 percent by weight, based on the rubber, of a hydrocarbon liquid for sufficient time to produce a fluid product. Heating for 0.1 to 50 hours at a temperature of 400° to 800°F., preferably from 550° to 700°F. will convert the solid rubber to a fluid which can be handled in the same way as conventional fuel oils.

If desired, the fluid can be blended with fuel oil to reduce its viscosity. Blends containing from 1 to 99 percent, preferably 5 to 95 percent, fluid can be employed.

The fluid can be treated, if desired, to remove certain materials therefrom, namely, metal or glass reinforcing materials, or carbon black, or both. If additional fuel oil is blended therewith, the mixture can advantageously be screened after the admixing step.

DETAILED DESCRIPTION OF THE INVENTION

In order to be in usuable form, the solid vulcanized rubber must be treated to render it in fluid form. The method will be described in detail.

In general, the solid vulcanized rubber to be treated will be in the form of used or scrap tires. Other forms and sources of vulcanized scrap rubber may be treated, however, and the method is applicable to any vulcanized rubber article for which recycling is desired. The polymeric content of the articles can be natural rubber or synthetic rubber, or blends of the two. By synthetic rubber is meant, chiefly, homopolymers of butadiene, isoprene, chloroprene, or piperylene, or copolymers of these monomers with each other or such comonomers as styrene, alpha-methylstyrene, divinylbenzene, ethylene, propylene, isobutylene, an ethylenically unsaturated carboxylic acid, ester or nitrile and the like.

The rubber can contain conventional sulfur curing systems, antioxidants, antiozonants, pigments, softeners and other well-known rubber chemicals and compounding ingredients. In any case, the rubber is sufficiently cross-linked, cured, or vulcanized as to be suitable for its original use, so that it will maintain its shape and have a certain degree of resiliency and elasticity. The process of the invention is not intended for use on scrap raw rubber, which has not been vulcanized or cross-linked. There is no reason why such scrap could not be treated similarly, but vulcanized or cross-linked rubber scrap is more plentiful, and presents a far more difficult problem. It has also been found that scrap tires which have been rejected because of defects are compatible with the process of the invention, without the need to age them several years as required in conventional rubber reclaiming processes. Thus, newly manufactured scrap tires can also be treated, as well.

If the vulcanized rubber is in the form of used or scrap tires it will normally contain reinforcing elements of metal or glass or organic fiber. These elements, or some of them, can be removed by a relatively expensive pre-treatment, or they can be left in place during the treatment. Removal of metal bead wires is preferred and is relatively inexpensive, but removal of cord elements is rather difficult and expensive by a pre-treatment, and the cords can usually be left in place. The presence of organic fibers in the rubber does not present a serious problem. Fibers of Nylon 6, Nylon 66, or polyethyleneterephthalate will be easily dispersed or solubilized in the hydrocarbon liquid along with the rubber. In the case of rayon fibers, these materials usually retain their integrity, and, if present, can be removed by screening. Glass or steel cord will similarly be unaffected by the treatment and can be similarly removed, if present.

If desired, the vulcanized rubber can be treated to reduce its particle size before the treatment. Although there is no theoretical reason why a whole scrap tire cannot be utilized in the process of the invention, certain practical constraints must be considered. Size-reduction can be performed in any convenient manner, and the particle size can be any size which facilitates handling. Commercial machinery is available which is capable of cutting a whole tire into small irregular size fragments, including the beads, which fragments are quite suitable for the process of the invention. If the beads or other steel reinforcing elements are not removed beforehand, they can be screened out of the product or removed by magnetic separation means. A reasonably small particle size piece of scrap rubber vulcanizate is desired from the standpoint of charging the reactor and ease of stirring the mixture. Considerations of cost of size-reduction by mechanical means vs. increased fluidization rates for smaller particles will generally dictate what size-reduction measures will be employed, if any.

The hydrocarbon liquid used can be chosen from a variety of materials and combinations thereof. In general, a hydrocarbon liquid which contains a substantial portion of aromatic constituents is preferred. The aromatic portion of the hydrocarbon can be a low-boiling aromatic hydrocarbon, such as benzene, or it can be a higher boiling aromatic hydrocarbon such as toluene, xylene, naphthalene, anthracene, phenanthrene, etc., or mixtures of two or more of these compounds.

For the hydrocarbon liquid, a rubber processing oil can be used, selected from a number of such products which are commercially available. It has been found that aromatic processing oils are especially effective in the process of the invention. Hydrocarbon oils derived from petroleum or coal tar are recommended. These oils are commonly used in rubber compounding, and are generally described as "naphthenic," "aromatic," or "paraffinic," depending on the type of predominant structure present in the oils. Any or all of these oils are operable in the process of the invention, however, the oils generally described as "aromatic," or "highly aromatic" are preferred. A description of some of the preferred oils is found in A.S.T.M. Specification D2226, with specific reference to types 101 and 102 listed therein.

One such oil, found to be particularly effective in the process of the invention is identified by its manufacturer as "Dutrex 726," with the following typical properties specified:

| | |
|---|---|
| Specified gravity at 60°F. | 0.9895 |
| Viscosity, SSU, 212°F. | 83 |
| Flash point, C.O.C., °F. | 425 |
| Volatility, 22 hrs. at 225°F., wt % | 0.2 |
| Neutralization No., mg. KOH/g. | 0.80 |
| Aniline point, °F. | 105 |

Alternatively, the hydrocarbon liquid can be a standard product of a refinery which is normally used as a fuel, paint-thinner, or the like. Also, the fluidized rubber itself can be used as the hydrocarbon liquid.

The use of from about 10 up to about 1,000 percent by weight of the hydrocarbon liquid, based on the scrap rubber, is recommended. The processing variables, namely, time, temperature, agitation (if used), the nature of the rubber and the composition of the hydrocarbon liquid, will determine the character of the fluid along with the relative proportions of rubber and hydrocarbon liquid. While the precise nature of the change is not known, it is surmised that one effect of the treatment of the rubber is to depolymerize a portion of the rubber to produce lower molecular-weight materials which reduce the viscosity of the soluble reclaim, and dissolve a substantial portion of the rubber. Thus, by incremental additions of more rubber after the first charge has been solubilized, the composition can approach 100 percent rubber asymptotically.

When a low-boiling aromatic hydrocarbon is employed, it can be distilled off the final mixture, if desired, to leave a fluid composition which is essentially 100 percent rubber.

Heat treatment at temperatures from 400° to 800°F., preferably 550°–700°F., for 0.1 to 50 hours or more is recommended. Naturally, the effects of time and temperature are interrelated, so that longer time will generally be required for lower temperatures, and vice versa. Temperatures lower than 400°F. are generally not economical, since too long a treatment time would be required. Temperatures above 800°F. may result in some carbonization of the rubber and would also require high operating pressures in the presence of low-boiling hydrocarbons which are generated in the process. Where high concentrations of rubber in the fluid are desired, the treatment will necessarily be more severe, in the higher ranges of both time and temperature.

The heat treatment can be performed at atmospheric pressure, or at higher pressures up to 50 atmospheres, if desired. Higher pressures will contain any volatiles in the mixture; alternatively, any volatiles which boil off can be condensed and either recovered separately or returned. In general, the treatment should be performed under pressure sufficient to maintain most of the materials in the liquid phase. The pressure can be autogenous, that is, produced by the vapor pressure of the materials at the elevated temperature of the reaction.

Another factor which affects the time and temperature of the process is the particle size of the rubber, which is indicative of its surface area. The larger surface area which accompanies a reduction in particle size will improve contact between the rubber and the hydrocarbon solvent, and thus speed the dissolution process. Better heat-transfer is also realized with smaller particles, hence, the reaction rate is increased. Since size-reduction adds cost to the product, the cost of this operation must be taken into account, offsetting increases in the rate of the dissolution reaction.

Agitation, while not essential to the process of the invention, generally acts to increase the dissolution rate. Both shear and displacement act to facilitate the process, effecting some size-reduction, and improving heat transfer.

In general, the procedure for converting the solid rubber to a fluid state is to change an autoclave with scrap rubber vulcanizate and a hydrocarbon liquid and to heat the mixture to effect dissolution of the hydrocarbon portion of the vulcanized scrap rubber. If the scrap vulcanized rubber charge had been previously treated to remove fabric, the fluid obtained from the autoclave can be used without further treatment. If the scrap vulcanized rubber charge contained fabric, the fluid as obtained from the autoclave can be screened to remove undissolved glass, steel or rayon fabric. As mentioned above, fabrics of nylon or polyester will generally not remain intact, and are not a problem. Magnetic separation can be employed if steel fragments are to be removed.

If the fluid is to be blended with fuel oils, the operations of separating out constituents will advantageously be done after the blending step, to take advantage of the resultant reduction in viscosity. If no oil is added, the separation operation is advantageously performed at elevated temperatures, again for reduction in viscosity.

Fragments of steel and glass, if present, can easily be removed by screening operations. If removal of carbon black is desired, gravity or centrifugal force, or both, can be employed to remove some of the denser carbon black.

Without the addition of fuel oil it is possible to obtain a fluid rubber which can be used in place of some of the heavier grades of fuel oil, such as Nos. 4 and 5.

If a lighter oil is desired, the fluid rubber may be blended with a lower viscosity fuel oil such as No. 2 fuel oil to meet appropriate standards such as viscosity, flash point, fire point, etc. Generally the fluid rubber may be blended with conventional fuel oils to give blends containing from about 1 weight percent to 99 weight percent of the fluid rubber in the blend. It will be clear to a person familiar with blending of oils that a range of conventional fuel oils can be blended with the fluid rubber to obtain any desired viscosity blended oil suitable for a particular oil-burner jet and boiler design.

While the addition of a light fuel oil has the beneficial effect of reducing the viscosity of the fluid rubber, other benefits are also realized. Since the fluid rubber contains small amounts of sulfur, adding oil will produce a mixture having a lower sulfur content, and thus lower levels of sulfur oxides in the combustion products.

A better understanding of the invention can be obtained by reference to the following examples, in which all percentages are by weight unless otherwise indicated.

EXAMPLE I

Preparation of Fluid Scrap Rubber

High concentrations of solubilized scrap in oil are best prepared by starting with lower concentrations of scrap rubber in the charge, and as a fluid solubilized scrap mixture is produced the concentration of scrap is built up by incremental addition of scrap rubber alone. This procedure provides efficient heat transfer between the walls of the reaction vessel and the solid scrap being solubilized.

A 20-gallon Dowtherm-jacketed reactor with a spiral agitator was used in the following pattern of increments for building up a 90/10 solubilized scrap rubber/Dutrex 726 product. The scrap used in this experiment was tire punchings (strips of rubber about ½×2×1 inches punched from scrap tires, mostly from the sidewalls). The conditions for each stage of the solubilization reaction were: temperature about 540°F. for about 24 hours; pressure, including nitrogen for initial pressure testing, was kept at about 50-150 psig. by occasional venting.

The charge procedure was as follows:

| Stage | Recharge from previous stage | Charge (lb.) Scrap | Charge (lb.) Dutrex 726 | Total Charge Scrap | Total Charge Dutrex 726 | Solubilized scrap/Dutrex 726 ratio | Product (lb.) Recharge | Product (lb.) Remove |
|---|---|---|---|---|---|---|---|---|
| 1 | — | 40 | 80 | 40 | 80 | 33/67 | 90 | 30 |
| 2 | 90 (30 scrap/60 oil) | 30 | — | 60 | 60 | 50/50 | 60 | 60 |
| 3 | 60 (30 scrap/30 oil) | 60 | — | 90 | 30 | 75/25 | 50 | 70 |
| 4 | 50 (37.5 scrap/12.5 oil) | 75 | — | 112.5 | 12.5 | 90/10 | — | 125 |

The final product was viscous but was discharged easily through a 1 inch pipe at about 170°F. and 50 psig. pressure. Glass and rayon fabric were strained out by forcing the product through a coarse (16-mesh) screen.

This sample of fluid scrap rubber was identified as Sample A.

EXAMPLE II

Direct Solubilization of Tire Punchings in Fuel Oil

To illustrate the effect of varying ingredient proportions and process conditions the following solubilization runs were made in a 1-gallon electrically-heated stirred autoclave.

| Run | Tire punchings | Commercial No. 2 fuel oil | Temp., °F. | Time, hours | Solubilization |
|---|---|---|---|---|---|
| B | 100 g. | 900 g. | >800 | 12 | Complete |
| C | 100 g. | 900 g. | 495–520 | 12 | Complete |
| D | 250 g. | 750 g. | 500 | 12 | Complete |
| E | 500 g. | 500 g. | 705 | 6 | Complete |

In all examples fabric (steel and glass) was separated by passing the products through a coarse screen. The products were of relatively low viscosity and suitable as a fuel. Typical inspection tests on the commercial No. 2 fuel oil are presented in Table I, following, as reference data.

TABLE I

| Quality | Typical Value Sample 1 | Typical Value Sample 2 | Test Method |
|---|---|---|---|
| TYPICAL INSPECTION TESTS ON COMMERCIAL NO. 2 FUEL OIL | | | |
| API Gravity | 31.9 | 33.0 | D 287 |
| Distillation | °F | °F | D 86 |
| IBP | 351 | 398 | |
| 10% | 409 | 441 | |
| 50% | 483 | 495 | |
| 90% | 561 | 560 | |
| EP | 608 | 593 | |

TABLE I—Continued

TYPICAL INSPECTION TESTS ON COMMERCIAL NO. 2 FUEL OIL

| Quality | Typical Value Sample 1 | Sample 2 | Test Method |
|---|---|---|---|
| Sediment & Water | Nil | Nil | D 1796 |
| Pour, °F. | −18 | −15 | D 97 |
| Cloud, °F. | −9 | −9 | D 2500 |
| Flash Point, °F. | 151 | 165 | D 56 |
| Visc. at 100°F., SSU | 34 | 34.0 | D 88 |
| Color | 0.8 | 1.2 | D 156, D1500 |
| Total Sulfur, % | .30 | 0.23 | D 1552, STM 179 |
| Mercaptan Sulfur % | 0.003 | .0005 | STM 7, STM 11 |
| Corrosion, 3 Hrs. at 212°F. | 1 A | 1 A | D 130 |
| Carbon Residue, 10% Btms, % | .18 | .07 | D 524 |
| Btu/gal. (Gross) | 140,123 | 139,800 | D 1405, STM 132 |
| Btu/lb. | 19,400 | 19,500 | — |
| Ash % | Nil | Nil | D 482 |

EXAMPLE III

Fluid scrap rubber Sample A was blended with a commercial No. 2 fuel oil in the weight ratio of 1:1.

The blend of Sample A/Commercial No. 2 fuel oil had a heating value of 17,600 Btu per pound. This result demonstrates that fluid scrap rubber when blended with a commerical fuel oil does have relatively high heating value.

EXAMPLE IV

Fluid scrap rubber Sample A was again blended with the commercial No. 2 fuel oil used in Example II and Example III. These blends contained 10 and 20 weight percent of Sample A and, for convenience of presenting experimental results, the blends are referred to as Blend 10 and Blend 20 in Table II.

TABLE II

INSPECTION TEST DATA ON FLUID SCRAP RUBBER/COMMERCIAL NO. 2 FUEL BLENDS

| Sample | Blend 10 | Blend 20 |
|---|---|---|
| Btu per lb. | 19,080 | 18,720 |
| Ultimate Analysis | | |
| Carbon % | 86.4 | 86.1 |
| Hydrogen | 12.1 | 11.5 |
| Sulfur | 0.4 | 0.5 |
| Nitrogen | 0.08 | 0.14 |
| Ash | 0.60 | 1.22 |
| Oxygen (By Diff.) | 0.42 | 0.54 |
| Total | 100.00 | 100.00 |
| API Gravity at 72°F | 30.8 | 25.8 |
| API Gravity at 60°F | 30.0 | 24.9 |
| Specific Gravity at 60°F | 0.8762 | 0.9047 |
| Flash and Fire Cleveland Open Cup. | | |
| Flash Point, °F | 165 | 165 |
| Fire Point, °F | 200 | 190 |
| Viscosity - Saybolt Furol | | |
| Seconds at 94°F | 7.0 | 10.2 |
| Seconds at 122°F | 5.2 | 7.5 |
| Water and Sediment (Centrifuge) ASTM D-96 | | |
| Water and Sediment % (By Volume) | 13.0 | 22.0 |

As shown by the data summarized in Table II above, both Blends 10 and 20 have heating values of 19,080 and 18,720 Btu per second and are only slightly less than the values for the commercial No. 2 fuel oil recorded in Table I. From a safety standpoint, both Blends 10 and 20 have flash points of 165°F. which is considered equivalent to typical values on No. 2 commercial fuel oils.

Generally, the inspection tests compare favorably with typical data on commercial No. 2 fuel oils with the exception of ash content and sediment.

The sediment values of 13.0 and 22.0 volume percent for Blends 10 and 20, respectively, are significantly higher than the "nil" values recorded in Table I for the commercial No. 2 fuel oils. This tendency to form sediment by centrifugation of Blends 10 and 20 indicates that the blend would have to be agitated to effect uniformity immediately prior to injection into an oil burner jet. This agitation could be accomplished relatively easily by known methods, such as by stirring, blowing with gas or simply pumping the blends to create turbulence. An alternative procedure to prevent sedimentation is to use a higher viscosity commercial fuel oil to blend with the fluid scrap rubber.

For example, fluid scrap rubber has been blended with residual-type fuel oils and sedimentation was not noted after several weeks storage. The higher viscosity of the residual-type fuel oils very effectively prevents settling of the carbon black contained in the fluid scrap rubber.

The ash content of Blends 10 and 20 (0.60 and 1.22 weight percent, respectively) are also significantly higher than the nil values of commercial No. 2 fuel oils. These high ash values will require dust collecting systems for boilers using fluid scrap rubber/commercial fuel oil blends as fuels. Efficient dust collecting systems such as bag filter, cyclones, scrubbing with water or electrostatic precipitators are well known in the industry and can be used.

As stated previously, one objective of the invention was to recover the valuable zinc and titanium content of scrap tires. To demonstrate the feasibility of this operation, a detailed analysis was conducted of the ash content of Blends 10 and 20. The data are summarized in Table III following.

TABLE III

ASH ANALYSIS

| Sample | Ash From Blend 10 | Ash From Blend 20 |
|---|---|---|
| Ash Analysis Spectrographic*, % | | |
| $SiO_2$ | 18. | 17. |
| $Al_2O_3$ | 10. | 10. |
| $Fe_2O_3$ | 0.5 | 0.5 |
| $TiO_2$ | 18. | 17. |
| $CaO$ | 9.5 | 9.0 |
| $MgO$ | 1.8 | 2.1 |
| $Na_2O$ | —** | —** |
| $NiO$ | <0.2 | <0.2 |
| $Cr_2O_3$ | <0.2 | <0.2 |
| $MoO_3$ | <0.06 | <0.06 |
| $V_2O_5$ | <0.1 | <0.1 |
| $CoO$ | <0.06 | <0.06 |
| $MnO_2$ | <0.06 | <0.06 |
| $CuO$ | <0.1 | <0.1 |
| $ZnO$ | Major (42.2)*** | Major (44.4)*** |
| $PbO$ | <0.06 | <0.06 |
| $SnO_2$ | <0.06 | <0.06 |
| $ZrO_2$ | <0.06 | <0.06 |

*The elements being reported as the oxides does not necessarily indicate their presence as such.
**Zn interference.
***By difference.

As shown, the titanium dioxide content of the ash derived from Blends 10 and 20 are, respectively, 18 and 17 percent. The major constituent of the ash is zinc oxide which can be calculated by summing the values of the other oxides and subtracting from 100. As indicated, the zinc oxide contents calculated by "difference" ranges from 42.2 to 44.4 percent.

The zinc value of this high assay zinc ash can be relatively easily recovered by any of several conventional means such as reduction of the zinc oxide with carbon and distilling the elemental zinc or by acid-leaching the ash and selective precipitation of the zinc as zinc hydroxide or other insoluble compound.

The titanium value could also be recovered by conventional means. For example, by reaction with chlorine to form titanium tetrachloride, distilling the titanium tetrachloride and hydrolyzing to titanium dioxide.

We claim:

1. The method of treating solid waste vulcanized rubber by the steps of heating the solid waste vulcanized rubber in contact with from about 10 up to about 1,000 percent of a hydrocarbon liquid at 400° to 800°F. for 0.1 to 50 hours to convert the solid waste vulcanized rubber to a fluid, transferring the fluid thus produced to combustion apparatus, burning the fluid, producing heat energy and ash, and collecting the ash and recovering zinc and titanium therefrom.

2. The method of claim 1, wherein the hydrocarbon liquid is a fuel oil.

3. The method of claim 1, wherein the hydrocarbon liquid is a rubber processing oil.

4. The method of claim 1, wherein the hydrocarbon liquid contains a substantial portion of aromatic constituents.

5. The method of claim 1, wherein the hydrocarbon liquid is fluidized rubber.

6. The method of claim 1, wherein a fuel oil is blended with the fluid in an amount so as to produce a blend containing from about 1 to 99 percent fuel oil before it is transferred to the combustion apparatus.

7. The method of claim 1, wherein the fluid is screened before it is transferred to the combustion apparatus.

8. The method of claim 1, wherein the fluid is treated to remove at least some carbon black therefrom before it is transferred to the combustion apparatus.

9. The method of claim 8, wherein the fluid is centrifuged.

10. The method of claim 1, wherein the heating step is conducted at 550° to 700°F.

* * * * *

PO-1050
(5/69)

UNITED STATES PATENT OFFICE
CERTIFICATE OF CORRECTION

Patent No. 3,890,141　　　　　Dated June 17, 1975

Inventor(s) Grant Crane, Edward L. Kay and Joseph R. Laman

It is certified that error appears in the above-identified patent and that said Letters Patent are hereby corrected as shown below:

In Column 1, Line 12, "facilitate" should read --facilities--.

In Column 4, Line 42, "change" should read --charge--.

In Column 7, Line 26, "commerical" should read --commercial--.

In Column 8, Line 19, "second" should read --pound--.

Signed and Sealed this sixteenth Day of September 1975

[SEAL]

Attest:

RUTH C. MASON
Attesting Officer

C. MARSHALL DANN
Commissioner of Patents and Trademarks